United States Patent
Riley et al.

(10) Patent No.: US 7,911,988 B2
(45) Date of Patent: Mar. 22, 2011

(54) SELECTING A NAVIGATION SOLUTION USED IN DETERMINING THE POSITION OF A DEVICE IN A WIRELESS COMMUNICATION SYSTEM

(75) Inventors: Wyatt T. Riley, King of Prussia, PA (US); Mark L. Moeglein, Ashland, OR (US); Zoltan Biacs, San Mateo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 682 days.

(21) Appl. No.: 10/565,993

(22) PCT Filed: Jul. 23, 2004

(86) PCT No.: PCT/US2004/023694
§ 371 (c)(1),
(2), (4) Date: Apr. 3, 2007

(87) PCT Pub. No.: WO2005/010549
PCT Pub. Date: Feb. 3, 2005

(65) Prior Publication Data
US 2007/0216540 A1 Sep. 20, 2007

Related U.S. Application Data

(60) Provisional application No. 60/489,653, filed on Jul. 23, 2003.

(51) Int. Cl.
G08G 1/16 (2006.01)
H04B 7/00 (2006.01)
H04Q 7/20 (2006.01)

(52) U.S. Cl. .................. 370/310.2; 370/310; 342/357.2; 340/903

(58) Field of Classification Search ............. 342/375.01–375.15, 457–991, 342/196, 357.06, 357.09, 357.15; 701/116–214; 370/310–349; 340/903; 455/414.3, 456.3, 455/343.1
See application file for complete search history.

(56) References Cited

U.S. PATENT DOCUMENTS

| | | | |
|---|---|---|---|
| 5,323,163 A * | 6/1994 | Maki | 342/357.15 |
| 5,982,324 A * | 11/1999 | Watters et al. | 342/357.06 |
| 6,289,280 B1 * | 9/2001 | Fernandez-Corbaton et al. | 701/214 |

\* cited by examiner

Primary Examiner — Afsar M. Qureshi
(74) Attorney, Agent, or Firm — Shyam K. Parekh (57) ABSTRACT

Different types of position solutions may be used to determine the position of a mobile station (104) in a wireless communication system (101). The position solutions include terrestrial, or network (102, 103), based techniques and non-network, such as satellite (160), based techniques. An apparatus and method whereby different position solutions are selected based on a figure of merit of the different solutions in determining a position of a mobile remote unit (104).

59 Claims, 5 Drawing Sheets

SELECTING A NAVIGATION SOLUTION USED IN DETERMINING THE POSITION OF A DEVICE IN A WIRELESS COMMUNICATION SYSTEM

CLAIM OF PRIORITY UNDER 35 U.S.C. §119

The present application for patent claims priority to Provisional Application No. 60/489,653, filed Jul. 23, 2003, and assigned to the assignee hereof and hereby expressly incorporated by reference herein.

BACKGROUND

The invention relates generally to modulated carrier wave communication devices, and more particularly, to communication method, apparatuses, and systems using electrical or electromagnetic signals transmitting an intelligence bearing signal from one point to another in the form of discrete variations in some parameter of the electrical or electromagnetic signal, used in conjunction with position location methods, apparatuses, and systems of the type in which a position is determined from a constellation of satellites.

Many different types of wireless systems for communications exist, such as cellular networks for telephone communication, broadband Personal Communication Services (PCS), wireless local-area networks (LANs), satellite communication systems, and two-way radio systems. Typically, these wireless systems include fixed infrastructure, having one or more communication devices, and remote units that may be either fixed or mobile. Examples of mobile remote units, also called mobile stations (MS), include cellular telephones, satellite telephones, wireless communication enabled personal computers, personal digital assistants (PDA), and other wireless devices. Fixed remote units can include, for example, wireless local loop (WIL) stations.

Typically, the infrastructure of a wireless system includes one or more base station (BTS) units at fixed positions that communicate with the MSs. The base stations may also communicate with fixed remote units, each other, or an external network.

In many situations, it is desirable to determine the position of a mobile MS. For example, many location-based services (LBS) communicate particular information to an MS user based on the location of the MS. For example, an LBS may provide an MS user with driving directions to a destination identified by the user, based on the user's location. Or an LBS may provide information about a current sales promotion if the user is located in close proximity to a store where the sale is taking place. Other LBSs include gaming, security, and fleet management.

Another motivation for determining the location of an MS is to support wireless carriers in complying with a U.S. Government Federal Communications Commission (FCC) regulation that requires carriers in the United States to be able to locate the position of a cellular telephone making an emergency "911" call within 50 meters for 67 percent of such calls and within 150 meters for 95 percent of such calls.

Different approaches to obtaining a position solution can be implemented to determine the geographic position of an MS in a communication system. The relative performances of the different approaches, as applied to any particular MS and type of wireless communications system, will depend, at least in part, on characteristics of the geographic region where the MS is located. Therefore, it would be desirable to select a position solution based on the performance of the position solution in the environment in which the MS is located. There is a need for a method and apparatus that can select a position solution approach.

SUMMARY

A method and apparatus for determining a geographic position of a remote unit in a wireless communication system includes determining a first position solution of the remote unit using a first set of position data, and determining a second position solution of the remote unit using a second set of position data. A selection is made between the first position solution and the second position solution based on a predetermined selection criterion.

The first set of position data can include network-based measurements, such as pilot phase measurements, and a round trip delay measurement. The second set of position data can include non-network-based measurements, such as satellite-based measurements including global positioning system (GPS) measurements.

Selecting between the first position solution and the second position solution can include comparing respective figures of merit for the two position solutions, for example comparing the relative horizontal estimate of position error of the respective position solutions. Also, the selection can be biased in favor of one of the position solutions, for example a GPS solution, unless an error metric of the other position is less than a threshold value, in which case, the other position solution can be selected.

DETAILED DESCRIPTION

Techniques are described that improve the selection of a position solution for determining the position of a mobile station (MS) in a wireless communication system. There are a variety of different solutions for determining the geographic position of MSs. The phrase "geographic position" is used to describe a position taking into account the flattening, non-spherical shape of the earth. This is also referred to as "geodetic position."

Generally, the different geographic position solutions fall within two categories, network-based, referred to as terrestrial solutions, and non-network-based, including satellite-based data.

Terrestrial solutions, in general, involve information about signals transmitted between an MS and the wireless communication system network, or infrastructure with which the MS operates. An example of such network-based solutions is measuring the time of arrival (TOA) of an MS signal received at two different fixed receivers within the network. The difference in the time of arrival of the signal at the respective different receivers defines a hyperbola upon which the MS is located.

Another example of a network-based solution is measuring the time difference of arrival (TDOA) of pilot signals that are synchronized to each other and transmitted from different transmitters in the network to the MS. Since most cellular system infrastructure antennas are sectorized and use a unique transmission signal for each sector, by identifying the unique transmission signal, information of the angle of arrival (AOA) of the signal from the BTS may be determined.

Another example of a network-based solution is measuring the round trip delay (RTD) of a signal transmitted from the network to the MS and back to the network. The RTD of a signal provides information of the range of the MS from the network transmitter/receiver.

Non-network-based solutions use information from sources other than the wireless network. For example, an MS can gather information from satellites of the global positioning system (GPS), land based transmitters of the long range navigation (LORAN) system, or another navigation system. If a non-network solution uses GPS, the MS acquires signals transmitted from at least four GPS satellites to determine a three dimensional position solution, or uses at least three satellites to determine a position solution if an altitude is known or assumed. By measuring the phase of the received GPS signals, and demodulating the navigation message on the GPS signal to recover the "ephemeris" data defining the position of the satellites, the position of the MS can be determined.

The network and non-network-based solutions can be combined in a so-called "hybrid solution" to improve the determination of the position of an MS. For example, in rural and suburban regions there may not be multiple network transmitters and receivers within range of the MS. A network-based solution, therefore, might not provide a sufficiently accurate position solution. However, in the same rural and suburban regions, a non-network-based solution can be determined by a GPS receiver, which will usually be able to acquire signals from four or more satellites.

Conversely, in dense urban regions and inside buildings, GPS receivers may not detect a sufficient number of satellite signals to be able to determine a position. However, in these areas there may be an adequate installed network infrastructure so that the MS is within range of two or more base stations. In other words, the hybrid solution takes advantage of information that is already available to both the MS and the wireless network, i.e. network-based solutions, and combines it with navigation information from outside the network, i.e. non-network-based solutions, to improve determining the position of the MS.

Figure 1:
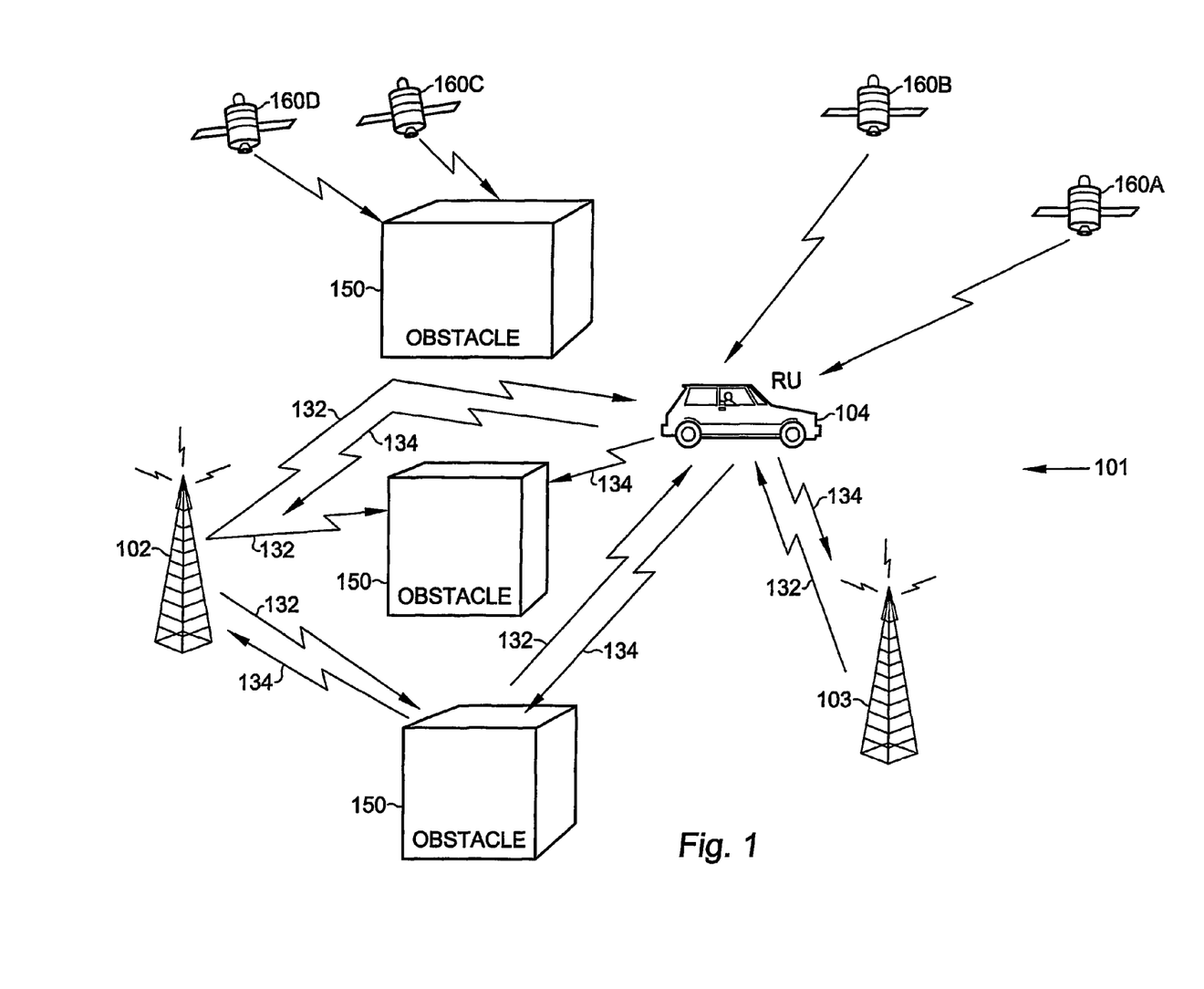
FIG. 1 is a diagram illustrating portions of a wireless communication system.

FIG. 1 is illustrates portions of a wireless communication system 101 that includes a wireless network infrastructure with multiple base stations 102 and 103, and multiple MSs 104 (only one MS being illustrated in FIG. 1 for simplicity). Examples of MS 104 include cellular telephones, satellite telephones, wireless communication enabled personal computers, personal digital assistants (PDA), and other wireless devices.

The wireless communication system 101 may be designed to support one or more wireless standards. For example, the standards may include TIA/EIA-95-B (IS-95), TIA/EIA-98-C (IS-98), 3rd Generation Partnership Project (3GPP); 3rd Generation Partnership Project 2 (3GPP2), TIA/EIA/IS-2000 (cdma2000), Wideband CDMA (WCDMA), or the like. In general, the techniques described herein can be used in any communication system conducted over analog or digital links and any communication system access technique, including time division multiple access (TDMA), frequency division multiple access (FDMA), code division multiple access (CDMA), or any other multiple access technique.

In general, signals 132 transmitted from a base station 102 or 103 to an MS 104 are referred to as being transmitted in the direction of the forward link, while signals 134 transmitted from an MS 104 to a base station 102 or 103 are referred to as being transmitted in the direction of the reverse link. Signals that travel in the forward link and the reverse link can travel different, multiple paths between a base station 102 and an MS 104. As shown, forward and reverse link signals may be reflected off obstacles 150, such as buildings, trees, cars, and people, resulting in multiple instances of the signal being received at the base station 102 and at the MS 104. These multiple signal instances are commonly referred to as "multipath" signals. In addition to reflecting signals, an obstacle can completely block signals transmitted between a base station 102 and an MS 104.

A multipath environment presents challenges to many of the possible position solutions. For example, if the signals that travel between the base station 102 and the MS 104 travel a "multipath" route, then position solutions that use signal travel time, such as the RTD, will be in error, because the signal has traveled a path that is greater than the actual distance between the base station 102 and the MS 104. Likewise, a position solution that uses the TDOA of pilot signals from different base stations will be in error because the time of travel of the signal will depend on the multipath distance, which is different from the actual distance between the base station 102 and the MS 104. Multipath can also cause an error in a position solution if the multipath is such that the signal received by an MS 104 originated in a different sector of the cell than the sector in which the MS is actually located. In addition to these problems, the multipath environment can result in decreased signal levels, so an MS 104 cannot receive signals from multiple base stations 102.

Obstacles 150 also can interfere with the MS 104 reception of satellite signals, such as the four (4) GPS satellites 160A-D shown. If there were no obstructions 150, the MS 104 would be able to receive signals from all four satellites 160A-D. However, the signal paths to the MS 104 of two of the satellites 160C and 160D are blocked by an obstacle 150. In this example, the MS 104 is only able to receive signals from two satellites 160A and 160B. Therefore a position solution cannot be determined based solely on GPS, because a minimum of four satellites is required for a three dimensional GPS solution.

Figure 2:
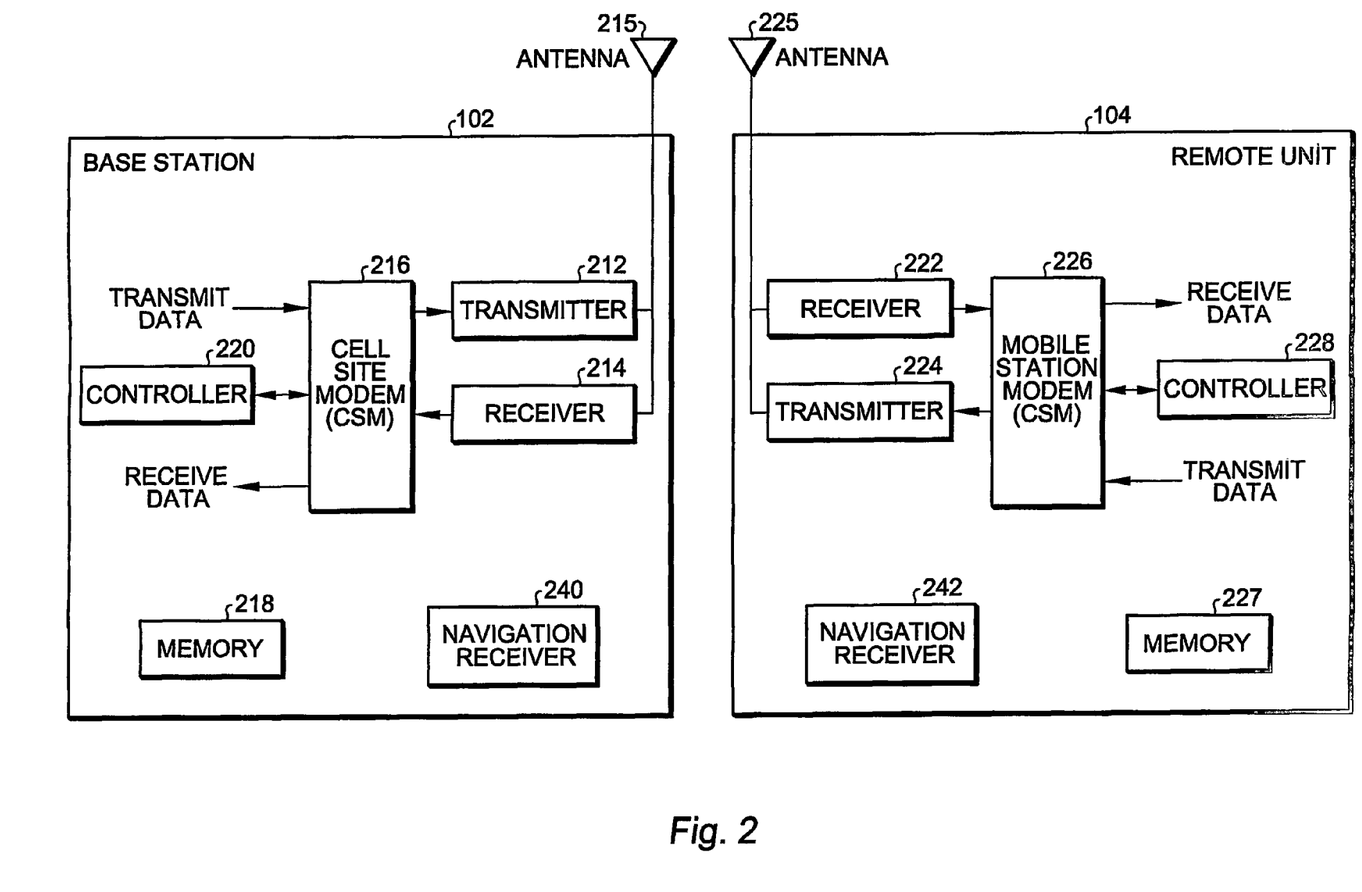
FIG. 2 is a block diagram illustrating additional detail of portions of the wireless communication system shown in FIG. 1.

FIG. 2 is a block diagram shows additional detail of portions of the wireless communication system 101, with construction details of a base station 102 and an MS 104. A transmitter 212, a receiver 214, an antenna 215, a cell site modem (CSM) 216, a memory block 218, and a controller 220 are included in the base station 102. A receiver 222, a transmitter 224, an antenna 225, a mobile station modem (MSM) 226, a memory block 227, and a controller 228 are included in the MS 104. The memory blocks 218 and 227 store, among other things, program instructions. Execution of the program instructions stored in the memory block 218 of the base station and memory block 227 of the MS by the base station controller 220 or the MS controller 228, respectively, can cause the base station 102 or MS 104 to operate in the manner described herein.

The base station 102 can include a navigation receiver 240, the MS 104 can include a navigation receiver 242, or both the base station 102 and the MS 104 can include navigation receivers 240, 242 respectively. Examples of navigation receivers that may be included in the base station 102 and the MS 104 include GPS receivers, LORAN receivers, "Galileo" receivers, Global Navigation Satellite System (GLONASS) receivers, or the like.

Figure 3:
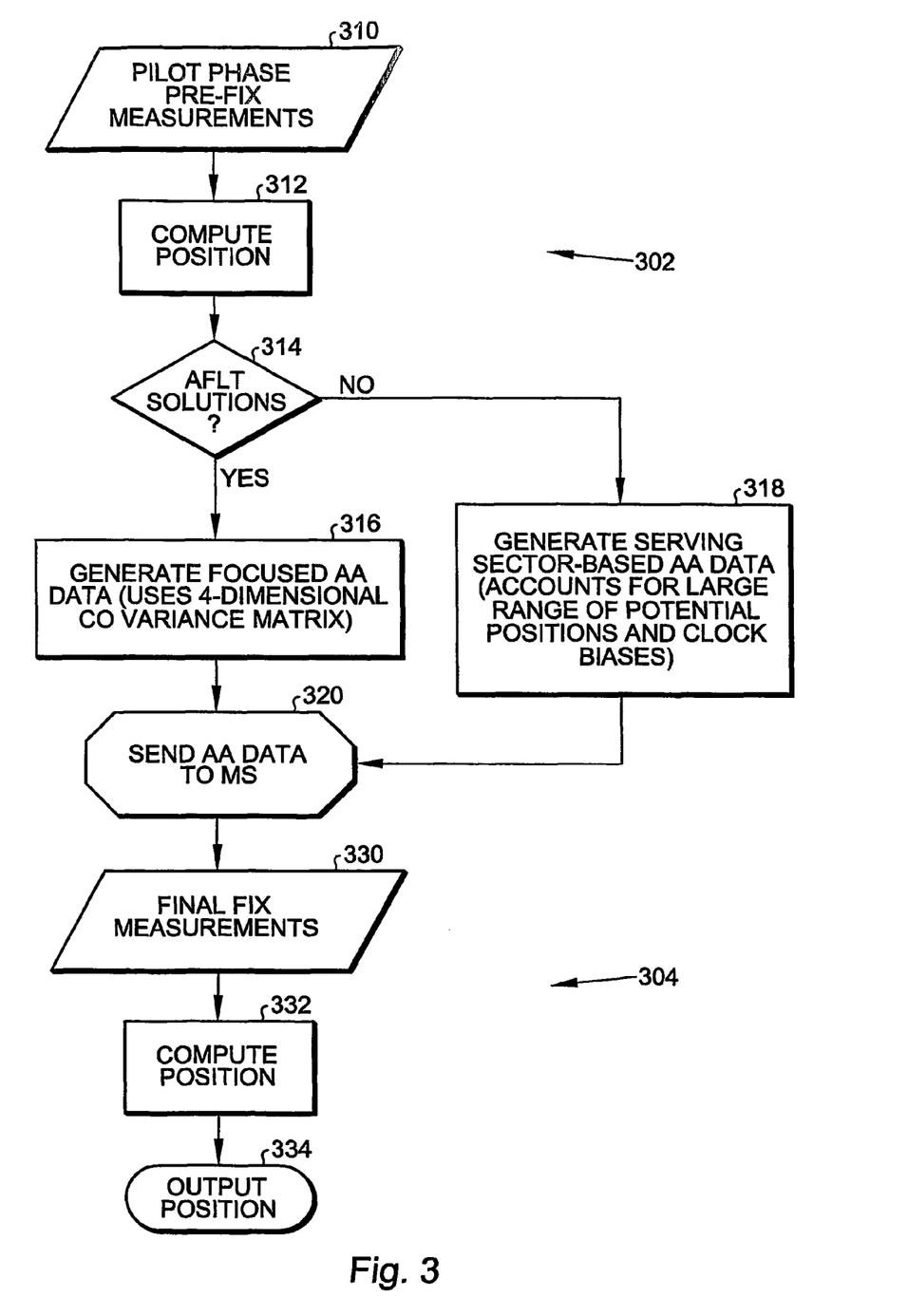
FIG. 3 is a flow chart illustrating steps for determining a position of a mobile station.

FIG. 3 is a flow chart illustrating operations for determining a geographic position solution of an MS 104. In FIG. 3, the operations 310-312 are performed to determine a pre-fix position 302, and operations 330-332 are performed to determine a final-fix position 304. To determine a pre-fix position 302, operation begins in block 310, where pilot phase measurements are made in the MS. Operation continues to block 312, where, using the pilot phase measurements made in the MS and other network-based measurements, a position solution of the MS 104 is determined in a position determination device that includes a position engine. The position engine may be in any device that communicates with the network. For example, the position engine may be in the MS, in a server connected to the network, or in another remote unit.

Flow continues to block 314 where it is determined if the computed position solution was an advanced forward link trilateration (AFLT) solution, i.e. a solution based on the pilot phase measurements, or if the solution was based on other network measurements. Usually, a position solution based on AFLT is more accurate than a position solution based on other network-based measurements, such as serving cell information. The pre-fix position of the MS can be used to generate acquisition assistance data used by the MS in making future measurements. Depending on the type of information used in determining the MS position solution, different sets of acquisition assistance data can be generated. For example, if the MS has a GPS receiver, the acquisition assistance data might include approximate phase measurements and Doppler shift for the GPS satellite signals that the MS will receive.

In block 314, if the MS position solution was based on AFLT, flow continues to block 315. In block 315 it is determined if there is additional network-based measurements available that can be used in generating acquisition assistance data. If there are no additional network-based measurements, a negative outcome at block 315, flow continues to block 316. In block 316 a set of focused acquisition assistance data is generated using the AFLT solution. The acquisition assistance data can be generated, for example, using a 4-dimensional covariance matrix.

Returning to block 315, if there are additional network measurements available, flow continues to block 317. In block 317, acquisition assistance data can be generated both by using the AFLT solution, such as an AFLT covariance matrix, and by using the additional network-based measurements. Then, the two different sets of acquisition assistance data may be combined to create a final set of acquisition assistance data for the mobile. For example, a combination may be selected as the intersection of the acquisition assistance data phase windows and/or Doppler windows for each satellite. Alternatively, the combination may be selected as the average of the acquisition assistance data phase windows and/or Doppler windows for each satellite.

Returning to block 314, if the MS position solution is not based on AFLT, flow continues to block 318. At block 318, because the position solution is not based on AFLT, the determination of the position solution is considered insufficiently accurate, so a set of less focused acquisition assistance data is generated that accounts for this inaccuracy. For example, the less focused acquisition assistance data can be based on network-based measurements other than AFLT, such as serving cell sector, RTD, AOA or TOA data. Flow from blocks 316 and 318 continues to block 320 where the acquisition assistance data is transmitted to the MS 104.

In determining a final-fix position 304 in block 330, the MS uses acquisition assistance data and makes final-fix measurements. For example, if the MS 104 has a GPS receiver, the MS may use the acquisition assistance data to measure GPS signals. The final-fix measurements are transmitted to the position determination device. Flow continues to block 332, where, using the final-fix measurements and any other measurements available, a position solution of the MS 104 is determined. Flow continues to block 334 where a final position solution of the MS is produced.

Figure 4:
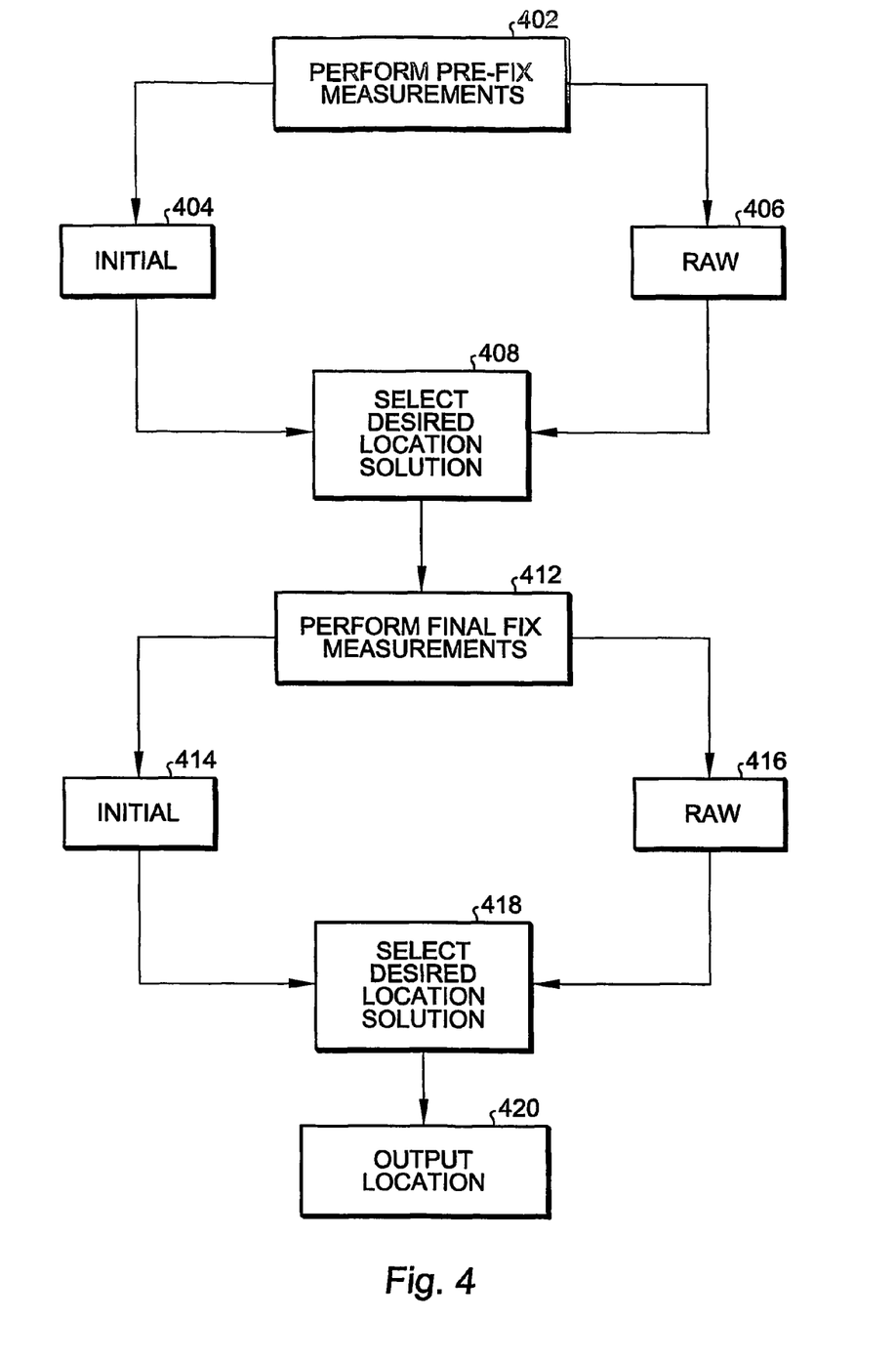
FIG. 4 is a flow diagram illustrating additional detail of a method of determining a position of a mobile station.

FIG. 4 illustrates additional detail of a method of determining a geographic position solution of an MS 104. Operation begins in block 402 where a set of pre-fix measurements are made at the MS 104 and are transmitted to the network. Flow continues to blocks 404 and 406, where "pre-fix." position determination is generated by a position engine, which can be part of any device that communicates with the network. The position engine may be provided, for example, by operating software in a server connected to the network infrastructure, or it can be provided by operating software in the MS 104.

In block 404 an initial coarse prefix position is determined using mixed cell network measurements. For example, the initial coarse pre-fix position may be determined, based on identification of base stations, or cells, with which the MS is communicating; the position can be determined based on measurements of signal power level of signals received from the MS; or on RTD. In block 406 an estimated, more precise, pre-fix position determination is produced based on additional network and non-network-based measurements. For example, the pre-fix estimated position may be determined based on pilot phase measurements of signals transmitted between the MS 104 and the base stations 102 and 104 in the network. In addition, an estimated pre-fix position determination may be based on satellite signals, such as GPS, as measured by the MS.

After the initial coarse and estimated pre-fix positions are determined, flow continues to block 408. At block, 408 either the initial coarse or estimated pre-fix position solution is selected and used as an input to an operation that generates acquisition assistance data. The selection between the initial coarse and estimated pre-fix position solutions can be based on relative figures of merit as to the accuracy of the pre-fix position solutions. For example, the selection can be based on a horizontal estimated position error (HEPE), receiver autonomous integrity monitoring (RAIM) quality metric, geometric dilution of precision (GDOP), position dilution of precision (PDOP), horizontal dilution of precision (HDOP), weighted DOPs, solution unit fault, measurement residual magnitudes, or other ranking of the two pre-fix position solutions. The output of the pre-fix selection process can also be a weighted average of the initial coarse and estimated pre-fix solutions rather than a selection of one or the other. Using the pre-fix position solution, acquisition assistance data is generated, such as GPS search window and Doppler estimates. Block 408 operation continues when the acquisition assistance data is transmitted to the MS 104.

Flow continues to block 412 to produce a final-fix. In block 412 the MS 104, using the acquisition assistance data, collects position data. For example, the MS 104 may collect data from GPS signals. The final-fix data are transmitted to the position engine. Flow continues to blocks 414 and 416 where, using the final-fix data and any other data available, the position engine determines a geographic position solution of the MS 104. In block 414 a coarse final fix is determined.

Typically, the coarse final-fix solution is the output of the pre-fix position from block 408, but the coarse final fix position solution can be supplemented with additional network-based measurements. For example, additional identification of base stations by the MS may be used to refine the coarse final-fix solution. In block 416 an estimated, more precise, final-fix position solution is determined based on additional network and non-network-based measurements. For example, the estimated final-fix position solution may be determined based on GPS signals or additional pilot phase measurements. In addition, the estimated final-fix solution may be a hybrid solution in which network and non-network measurements are combined to determine an estimated final fix position.

Determination of whether the estimated final fix position solution is based on non-network measurements, e.g. GPS, or is based on a hybrid solution, e.g. GPS and network measurements, can be based on an evaluation of the merits of the respective measurements. For example, if a non-network only estimated final-fix position solution has an estimated error above a predetermined value then a hybrid solution may be preferred.

A predetermined selection value may be used to bias the determination of the estimated final-fix solution to a preferred type of solution, for example between non-network-based and hybrid solutions. In other words, the magnitude of a predetermined selection value can ensure that the preferred type solution is used for producing a position solution in a majority of situations. For example, if the selection between non-network and hybrid solutions is based on the magnitude of the estimated error of a non-network-based solution being less than a predetermined solution value, then the use of a greater value for the predetermined selection value will bias the selection in favor of the non-network-based solution. Conversely, a lesser value for the predetermined selection value will bias the selection in favor of the hybrid-based solution.

For example, a horizontal estimate of position error (HEPE) of a position solution can be evaluated to select between a non-network-based solution and a hybrid solution for the estimated final fix position solution. It has been found that if a non-network-based solution is a GPS solution, then using the GPS solution if it has a HEPE of 500 meters or less provides good results. In general, if a GPS solution of reasonable quality is possible at all, it will have a HEPE of less than 500 meters. Thus, using a HEPE of 500 meters for the predetermined selection value will bias the selection in favor of selecting the GPS solution.

Another technique for selecting between a GPS-only solution and a hybrid solution can be based on the HEPE of the GPS solution and the HEPE of the coarse final fix solution. For example, if the GPS solution has a HEPE that is less than the predetermined selection value and less than the coarse final-fix HEPE, then the selection will be to use the GPS-only solution, otherwise the selection will be to use a hybrid solution. In this example, if the predetermined selection value is a HEPE of 500 meters, then the GPS-only solution is used if the GPS solution HEPE is less than 500 meters and less than the HEPE of the coarse final-fix, otherwise a hybrid solution is used.

Flow continues from blocks 414 and 416 to block 418, where a selection between the coarse and estimated final-fix position solutions is made. Selection between the coarse and estimated final-fix position solutions may be based on a figure of merit for each of the solutions. For example, selection between the coarse and estimated final-fix position solutions can be based on which of the solutions has a lower HEPE. In addition, the coarse and estimated final-fix position solutions may be combined, such as with a weighted average, to determine a final-fix solution. After selecting a final-fix solution, flow continues to block 420 where the final position is output.

Figure 5:
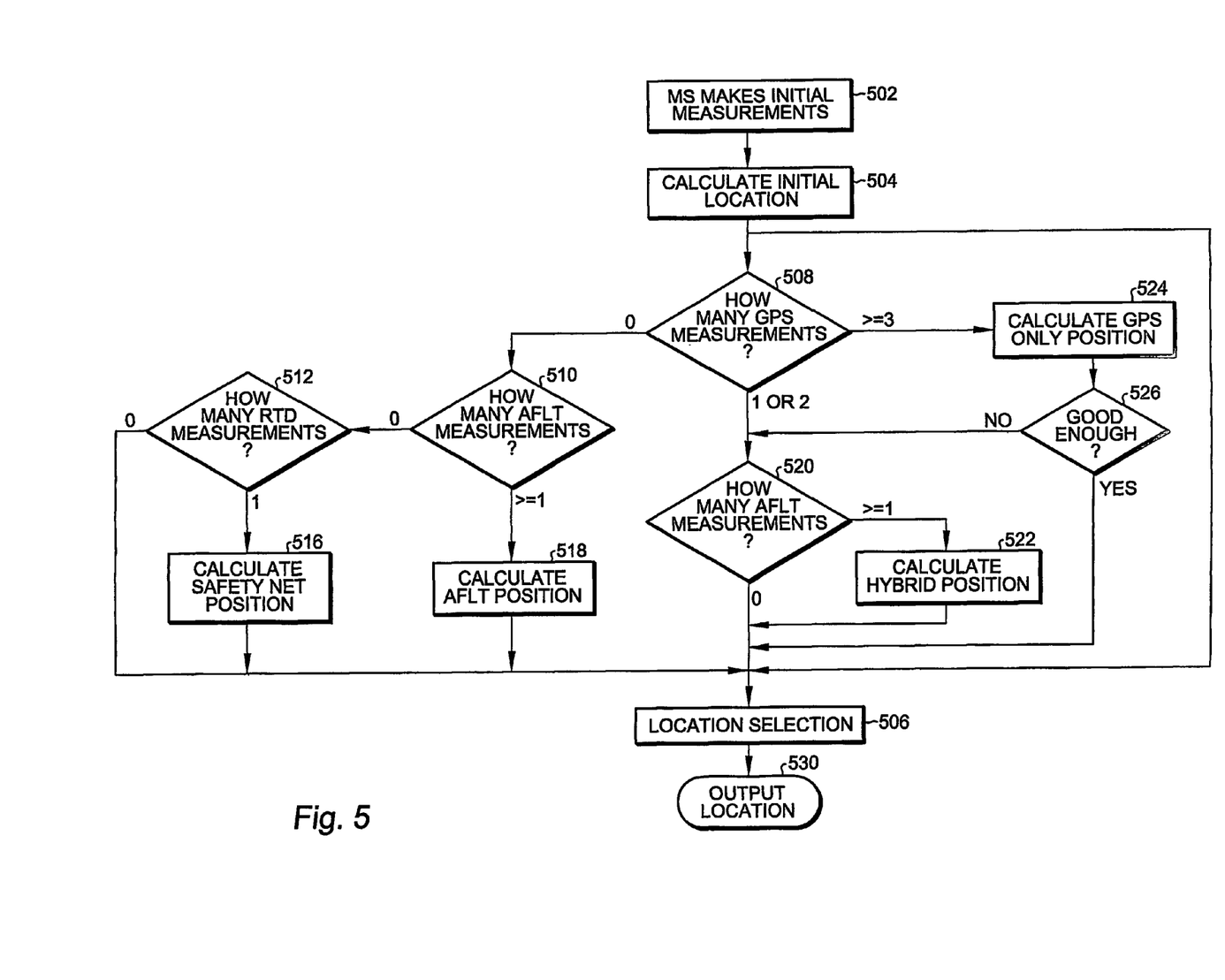
FIG. 5 is a flow diagram illustrating additional aspects of a method of determining a position of a mobile station.

FIG. 5 shows additional aspects of determining a geographic position of an MS 104, and is applicable to both the pre-fix and the final-fix position solutions discussed above. Flow begins in block 502 where an MS 104 makes measurements. Examples of the types of measurements that the MS 104 makes include pilot phase measurements, base station identification, and GPS measurements. The measurements made by the MS 104 may be used by the MS, or may be transmitted to a base station, another MS, or any device within the network infrastructure.

Flow continues to block 504 where the measurements are used by a position engine to calculate an initial position of the MS 104. The calculation of the initial MS position may be based on the measurements received from the MS 104, other network-based measurements, or a combination of the various measurements. In determining the initial position of the MS 104, an initial assumption of the MS 104 position can be made. For example, the initial MS 104 position can be taken to be the previous position of the MS 104. Alternatively, the initial position may be determined by known geographic coverage areas of network elements in communication with the MS. 104 Measurement residuals can then be used to update the position estimate.

The residuals can be derived from different "iteration" solvers, such as, least mean squares, including pilot reweighting, orthogonals, delta vector limiting, as well as algebraic solvers. Examples of some techniques for determining the MS position based on an initial coarse position estimate from the MS, which is derived based on initial estimates of the MS position, are described in U.S. Pat. No. 6,570,530 entitled "METHOD AND APPARATUS PROVIDING IMPROVED POSITION ESTIMATE BASED ON AN INITIAL COARSE POSITION ESTIMATE" issued May 27, 2003 assigned to the assignee of this application.

The initial position calculated in block 504 is simultaneously provided to the position selector block 506 operation and the decision block 508 operation. The selector block 506 receives the initial position solution for later comparison against alternative position solutions as described below. In block 508 it is determined how many GPS measurements are available. If there are no GPS measurements available, then flow continues to block 510. In block 510 it is determined how many AFLT measurements are available. If there are no AFLT measurements available, flow continues to block 512. In block 512 it is determined if an RTD measurement is available. If there is no RTD measurement available, then flow continues to block 506.

Returning to block 512, which is entered when there are no GPS or AFLT measurements available, if there is an RTD measurement available then flow continues to block 516. In block 516 a "safety net" position is calculated based on the RTD measurement. The RTD-calculated MS position is output from block 516 and input to the position selector block 506.

Returning to block 510, which is entered if there are no GPS measurements available, it is determined if there are any AFLT measurements available. If there is at least one AFLT measurement available, flow continues to block 518. In block 518 a position of the MS is calculated using the at least one AFLT measurements. The AFLT-calculated MS position is output from block 518 and input to the position selector block 506.

Returning to block 508 where it is determined if any GPS measurements are available, if there are one or two GPS measurements available, flows continues to block 520. In block 520 it is determined if there are any AFLT measurements available. If there are no AFLT measurements available, a "0" outcome results, then operation proceeds to the position selector block 506. If, in block 520, it is determined that there is at least one AFLT measurement available, then flow continues to block 522. In block 522 the AFLT and GPS measurements are combined to calculate a hybrid position of the MS 104. The hybrid position solution is input to the position selector block 506.

Returning to block 508, if it is determined that there are at least three GPS measurements available, then flow continues to block 524. In block 524 the GPS measurements are used to calculate the MS position. Flow then continues to block 526. In block 526 it is determined if the GPS-only position calculation is accurate enough, or if it is desirable to do additional processing to determine the position of the MS 104. For example, in block 526 the HEPE of the GPS calculation can be compared to a predetermined value to decide if the GPS measurement is accurate enough. Other parameters may also be used to evaluate if the GPS solution is accurate enough, such as, the signal strength of the received GPS signals, the relative position of the GPS satellites, the geometric dilution of precision (GDOP), the position dilution of precision (PDOP), the horizontal dilution of precision (HDOP), weighted DOPs, the solution unit fault, and the measurement residual magnitudes. If it is determined that the GPS measurement is accurate enough, a "Yes" outcome at block 526, then it is provided to the position selector block 506. If the GPS measurement is not accurate enough, a "No" outcome, then flow continues to block 520.

As noted above, in block 520 it is determined if there are any AFLT measurements available. If there are no AFLT measurements available, then the GPS position, calculated in block 522 is input to the position selector block 506. If, in block 520, it is determined that there is at least one AFLT measurement available flow continues to block 522, where the GPS and AFLT measurements are combined to calculate a hybrid position of the MS. The hybrid solution is input to the position selector block 506.

In selector block 506 all of the position solutions that have been calculated for the MS 104 are evaluated, and a desired position solution is selected. The evaluation of the various position solutions can be based on relative figures of merit of the solutions, such as the HEPE of each measurement. The selection of the desired solution can also be biased to a preferred solution type. For example, if a GPS only solution is preferred, then a predetermined position-type selector value can be compared with the HEPE of the GPS solution, and, as long as the GPS solution HEPE is less than the predetermined position type selector value, the GPS solution will be selected. The predetermined position-type selector value can be selected so that a GPS solution is used a majority of the time.

Another example is to select the GPS solution as long as its HEPE is not more than a predetermined amount greater than the HEPE of another solution type, for example, by more than 30% or 50%. Other selection techniques can also be used, such as selecting the GPS solution if its HEPE is less than a predetermined value and less than the HEPE of the initial position solution. After the desired position solution has been selected, flow continues to block 530 and the selected position is output.

As noted above, in one embodiment, a pre-fix position solution of the remote unit is determined using at least two types of position measurement solutions. Then, an estimated error for each of the pre-fix position solutions is determined. Selection of a desired pre-fix position solution is based on the figures of merit of the respective position solutions. A final-fix position solution of the remote unit is determined using at least one type of position measurement solution and the selected pre-fix position solution. A desired final position solution is selected as the geographic position of the remote unit, based on respective estimated errors of the desired pre-fix position solution and the final-fix position solution.

The pre-fix position solution can include using mixed cell sector position data, and advanced forward link trilateration data. Selecting a desired pre-fix position solution can include evaluating a horizontal estimated position error of the solutions, determining a weighted average of initial solutions, or determining the solution reliability with techniques such as RAIM.

The final-fix position solution can include using non-network-based measurement systems, such as a satellite measurement system like the global positioning system, the GLONASS system, the Galileo system, or the like. Selecting a desired final-fix position solution includes evaluating a horizontal estimated position error of the solutions, determining a weighted average of initial solutions, or determining the solution reliability with techniques such as RAIM.

A remote unit includes a receiver configured to receive signals from a wireless network infrastructure and a transmitter configured to transmit signals to the wireless network infrastructure. The remote unit also includes a controller configured to process signals received from the wireless network and collect data to be used in determining a position solution. The collected data is transmitted to the wireless network, another remote unit, or other device where a position solution is determined. The remote unit includes a navigational receiver, for example a global positioning system receiver, configured to process non-network-based signals and collect data to be used in determining a position solution. The data collected is transmitted to the wireless network, another remote unit, or other device where a position solution is determined.

A position determination device in a wireless communication system, is configured to receive signals from a remote unit, including data produced from network signals and non-network signals to be used in determining a position solution. The device processes the data to determine at least two position solutions, and then selects a desired position solution based on respective figures of merit of the position solutions. In one embodiment, a position engine processes the data to determine the position solutions.

The position determination device can also generate acquisition assistance data based on a position solution processed using network-based data and transmit the acquisition assistance data to the remote unit to be used by the remote unit in processing non-network-based signals. For example, the acquisition assistance data can assist the remote unit in processing global positioning system signals.

The position determination device can also determine a pre-fix position solution and a final-fix position solution, and select a desired final solution as the geographic position of the remote unit based on respective estimated errors of the position solutions.

Herein, information and signals may be represented using any of a variety of different technologies and techniques. For example, voltages, currents, electromagnetic waves, magnetic fields or particles, optical fields, particles, or any combination thereof may represent data, instructions, information, and signals referenced above.

Furthermore, the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method or technique described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium. An exemplary storage medium is configured such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The invention claimed is:

1. A method of determining a geographic position of a remote unit in a wireless communication system, comprising:
   determining a pre-fix position solution of the remote unit for each of at least two types of position measurement solutions;
   selecting a desired one of the pre-fix position solutions based on figures of merit of the respective position solutions;
   determining a final-fix position solution of the remote unit using at least one type of position measurement solution and the selected pre-fix position solution; and
   selecting a desired final position solution as the geographic position of the remote unit based on respective figures of merit of the desired pre-fix position solution and the final-fix position solution.

2. The method of claim 1 wherein determining the pre-fix position solution includes using mixed cell sector position data.

3. The method of claim 1 wherein determining the pre-fix position solution uses advanced forward link trilateration.

4. The method of claim 1 wherein selecting a desired pre-fix position solution includes evaluating a horizontal estimated position error of the solutions.

5. The method of claim 1 wherein selecting a desired pre-fix position solution includes determining a weighted average of initial solution.

6. The method of claim 1 wherein selecting a desired pre-fix position solution includes determining a receiver autonomous integrity monitoring quality metric.

7. The method of claim 1 wherein selecting a desired pre-fix position solution includes evaluating the relative geometric dilution of precision error of the solutions.

8. The method of claim 1 wherein selecting a desired pre-fix position solution includes evaluating the relative position dilution of precision error of the solutions.

9. The method of claim 1 wherein selecting a desired pre-fix position solution includes evaluating the relative horizontal dilution of precision error of the solutions.

10. The method of claim 1 wherein selecting a desired pre-fix position solution includes evaluating the relative weighted dilution of precision error of the solutions.

11. The method of claim 1 wherein selecting a desired pre-fix position solution includes evaluating the relative unit fault of the solutions.

12. The method of claim 1 wherein selecting a desired pre-fix position solution includes evaluating the relative residual magnitudes of the solutions.

13. The method of claim 1 wherein determining the final-fix position solution includes using measurements of signals of the communication system itself.

14. The method of claim 13 wherein determining the final-fix position solution includes using advanced forward link trilateration position data.

15. The method of claim 13 wherein determining the final-fix position solution includes using mixed cell sector position data.

16. The method of claim 13 wherein determining the final-fix position solution includes using round-trip-delay position data.

17. The method of claim 1 wherein determining the final-fix position solution includes using non-network-based measurement systems.

18. The method of claim 17 wherein the non-network-based measurement system includes a satellite measurement system.

19. The method of claim 18 wherein the satellite measurement system includes a global positioning system.

20. The method of claim 18 wherein the satellite measurement system includes a GLONASS system.

21. The method of claim 18 wherein the satellite measurement system includes a Galileo system.

22. The method of claim 1 wherein selecting a desired final-fix position solution includes evaluating a horizontal estimated position error of the solutions.

23. The method of claim 1 wherein selecting a desired final-fix position solution includes evaluating the geometric dilution of precision error of the solutions.

24. The method of claim 1 wherein selecting a desired final-fix position solution includes evaluating the relative position dilution of precision error of the solutions.

25. The method of claim 1 wherein selecting a desired final-fix position solution includes evaluating the relative horizontal dilution of precision error of the solutions.

26. The method of claim 1 wherein selecting a desired final-fix position solution includes evaluating the relative unit fault of the solutions.

27. The method of claim 1 wherein selecting a desired final-fix position solution includes evaluating the relative residual magnitudes of the solutions.

28. The method of claim 1 wherein selecting a desired final-fix position solution includes determining a weighted average of final-fix position solutions.

29. The method of claim 1 wherein selecting a desired final-fix position solution includes determining a receiver autonomous integrity monitoring metric.

30. The method of claim 1 wherein the remote unit is a mobile station.

31. A method of determining a geographic position of a remote unit in a wireless communication system, comprising:
   determining a first position solution based on mixed cell network measurements;
   determining a second position solution based on pilot phase measurements;
   selecting a pre-fix position solution from between the first position solution and the second position solution; and
   generating acquisition assistance data based on the selected pre-fix position solution.

32. The method of claim 31 further comprising:
   receiving global positioning system signals using the acquisition assistance data;
   determining a third position solution using network-based measurements;
   determining a fourth position solution using global positioning system measurements processed with the acquisition assistance data; and
   selecting between the third position solution and the fourth position solution as the geographic position of the remote unit in accordance with a predetermined selection criteria.

33. The method of claim 32 wherein selecting between the third position solution and the fourth position solution includes comparing respective figures of merit for the two solutions.

34. The method of claim 33 wherein comparing includes evaluating the respective horizontal estimate of position error of the two solutions.

35. The method of claim 33 wherein comparing is biased in favor of one of the position solutions.

36. The method of claim 33 wherein comparing is biased in favor of the position solution using global positioning system measurements.

37. The method of claim 31 wherein selecting between the first position solution and the second position solution includes comparing respective figures of merit of the two solutions.

38. The method of claim 37 wherein comparing includes evaluating the respective horizontal estimate of position error of the two solutions.

39. The method of claim 37 wherein comparing includes evaluating the respective geometric dilution of precision of the two solutions.

40. The method of claim 37 wherein comparing includes evaluating the respective position dilution of precision error of the two solutions.

41. The method of claim 37 wherein comparing includes evaluating the respective horizontal dilution of precision error of the two solutions.

42. The method of claim 37 wherein comparing includes evaluating the respective unit fault of the two solutions.

43. The method of claim 37 wherein comparing includes evaluating the respective magnitude of the two solutions.

44. The method of claim 37 wherein the remote unit is a mobile station.

45. A position determination device in a wireless communication system, comprising:
   a position engine to receive data produced from network signals and non-network signals and to process the data to determine at least two position solutions; and
   a controller to select a desired position solution based on respective figures of merit of the position solutions, wherein acquisition assistance data is generated using an advanced forward link trilateration covariance matrix.

46. A position determination device in a wireless communication system, comprising:
   a position engine to receive data produced from network signals and non-network signals and to process the data to determine at least two position solutions; and
   a controller to select a desired position solution based on respective figures of merit of the position solutions,
   wherein the controller further includes generating acquisition assistance data based on a position solution processed using network-based data wherein the acquisition assistance data is used by a remote unit in processing non-network-based signals,
   further including generating two sets of acquisition assistance data, wherein a first of the two sets of acquisition data is generated using an advance forward link trilateration covariance matrix and a second of the two sets of acquisition data is generated using additional network-based data.

47. The device of claim 46 wherein the two sets of acquisition assistance data are combined to generate a final set of acquisition assistance data.

48. The device of claim 47 wherein the combination is selected as an intersection of an acquisition assistance data phase window for a global positioning system satellite signal.

49. The device of claim 47 wherein the combination is selected as an intersection of an acquisition assistance data Doppler window for a global positioning system satellite signal.

50. The device of claim 47 wherein the combination is selected as an intersection of an acquisition assistance data phase window and a Doppler window for a global positioning system satellite signal.

51. The device of claim 47 wherein the combination is selected as an average of an acquisition assistance data phase window for a global positioning system satellite signal.

52. The device of claim 47 wherein the combinations selected as an average of an acquisition assistance data Doppler window for a global positioning system satellite signal.

53. The device of claim 47 wherein the combination is selected as an average of an acquisition assistance data phase window and a Doppler window for a global positioning system satellite signal.

54. A position determination device in a wireless communication system, comprising:
   a position engine to process data from a remote unit and to determine a pre-fix position solution and a final-fix position solution; and
   a controller to select a desired final solution as the geographic position of the remote unit based on respective estimated errors of the position solutions.

55. The device of claim 24 wherein determining the pre-fix position solution includes processing data of network-based measurements.

56. The device of claim 54 wherein determining a final-fix position solution includes processing data of non-network-based measurements.

57. The device of claim 54 wherein selecting a desired final position includes evaluation of respective estimated errors of the solutions.

58. A remote unit for use in a wireless communication system, comprising:
   a controller to collect a first set of measurement data on signals receiver by the remote unit;

a position engine to accept the first set of data and to determine a first position solution of the remote unit, wherein using knowledge of the first position solution the controller collects a second set of measurement data on signals received by the remote unit and the position engine accepts the second set of data and determines a second position solution of the remote unit, and the controller selects between the first and second position solutions based on a predetermined selection criteria, wherein the first position solution and the second position solution are based on separate measurements.

59. A remote unit for use in a wireless communication system, comprising:

a controller to collect a first set of measurement data on signals receiver by the remote unit;

a position engine to accept the first set of data and to determine a first position solution of the remote unit, wherein the controller collects a second set of measurement data on signals received by the remote unit and the position engine accepts the second set of data and determines a second position solution of the remote unit, and the controller selects between the first and second position solutions based on a predetermined selection criteria, wherein the first position solution and the second position solution are based on separate measurements.

* * * * *